(12) United States Patent
Berthier

(10) Patent No.: US 9,046,211 B2
(45) Date of Patent: Jun. 2, 2015

(54) MECHANICAL SUPPORT FOR THERMAL OR ELECTRIC SYSTEMS

(71) Applicant: Commissariat A L'Energie Atomique Et Aux Energie Alternatives, Paris (FR)

(72) Inventor: Romain Berthier, Igny (FR)

(73) Assignee: Commissariat A L'Energie Atomique Et Aux Energies Alternatives, Paris (FR)

( * ) Notice: Subject to any disclaimer, the term of this patent is extended or adjusted under 35 U.S.C. 154(b) by 50 days.

(21) Appl. No.: 13/910,281

(22) Filed: Jun. 5, 2013

(65) Prior Publication Data
US 2013/0327903 A1 Dec. 12, 2013

(30) Foreign Application Priority Data
Jun. 8, 2012 (FR) ...................................... 12 55356

(51) Int. Cl.
| | | |
|---|---|---|
| *F16M 9/00* | (2006.01) | |
| *F16M 11/00* | (2006.01) | |
| *H01F 6/04* | (2006.01) | |

(52) U.S. Cl.
CPC . *F16M 11/00* (2013.01); *H01F 6/04* (2013.01)

(58) Field of Classification Search
CPC ....... H01F 17/02; H01F 27/08; A47B 7/0246; A47B 91/005; E02D 27/42; F16M 5/00
USPC ........... 336/60, 65; 248/678, 679, 174, 176.2, 248/188.1, 188.2, 346.4, 346.5; 52/79.4, 52/292; 405/230
See application file for complete search history.

(56) References Cited

U.S. PATENT DOCUMENTS

| | | | |
|---|---|---|---|
| 1,342,310 A | | 6/1920 | Steinberger |
| 1,342,311 A | * | 6/1920 | Steinberger ..................... 336/60 |
| 2,568,783 A | * | 9/1951 | Woodruff ................... 241/285.1 |
| 2,795,765 A | | 6/1957 | Stroble |
| 5,030,029 A | * | 7/1991 | Johnsen ............................ 404/6 |
| 5,034,716 A | | 7/1991 | Mokadam |
| 6,518,499 B1 | * | 2/2003 | Kessler .......................... 174/50 |
| 6,688,573 B2 | * | 2/2004 | Reed et al. .............. 248/346.01 |
| 6,968,583 B1 | * | 11/2005 | Rich .............................. 5/509.1 |
| 7,717,395 B2 | * | 5/2010 | Rowan et al. ................. 248/678 |
| 7,722,005 B2 | * | 5/2010 | Reed et al. .............. 248/346.01 |
| 8,156,694 B2 | * | 4/2012 | Knight et al. ................ 52/126.6 |
| 8,534,632 B1 | * | 9/2013 | Mancuso, Jr. ............. 248/346.5 |
| 8,714,307 B2 | * | 5/2014 | Burnett ...................... 182/181.1 |
| 2009/0206231 A1 | * | 8/2009 | Firman et al. ................. 248/677 |
| 2011/0148417 A1 | | 6/2011 | Lvovsky |
| 2013/0087680 A1 | * | 4/2013 | Austin et al. ................. 248/676 |
| 2014/0157688 A1 | * | 6/2014 | Bertke et al. ................ 52/126.1 |

OTHER PUBLICATIONS

French Search Report dated Jan. 31, 2013.

* cited by examiner

*Primary Examiner* — Bradley Duckworth
(74) *Attorney, Agent, or Firm* — Burr & Brown, PLLC

(57) ABSTRACT

A mechanical support for thermal or electric systems. The support is hollowed, and includes two bearing surfaces, substantially parallel to each other, and separated from each other by a lateral surface defining a perimeter. The lateral surface includes through openings, distributed along at least one row substantially parallel to the bearing surfaces. The support includes at least one stiffening flange, in contact with the lateral surface of the support, all along the perimeter of the lateral surface, on or in the vicinity of the or of each row of through openings.

14 Claims, 3 Drawing Sheets

MECHANICAL SUPPORT FOR THERMAL OR ELECTRIC SYSTEMS

FIELD OF THE INVENTION

The present disclosure relates to systems intended to be used as a support in applications requiring both properties of mechanical stability and good thermal and/or electric isolation properties.

The present invention especially, but not exclusively, applies in cryogenics. Cryogenics designates the field of temperatures lower than 120 Kelvin (K), that is, −150 degrees Celsius (° C.), below which air gases liquefy.

For example, the present invention may thus be used as a support for magnets to be electrically isolated.

More specifically, the present invention may be used as a support for solid superconducting magnets, for thermal cameras, for cryostats, for calorimeters, or also for bolometers currently used in astrophysics.

BACKGROUND

In certain applications, it is necessary to combine a high mechanical stability, also called buckling strength, with a high thermal and/or electric isolation power. This is especially true for mechanical supports for "cryogenic" systems. Such supports comprise two bearing surfaces, one of these surfaces being in contact with an object to be maintained at cryogenic temperatures, and the other surface being in contact with an environment capable of being at another temperature. In the case of superconducting magnets, for example, such supports may be submitted to very high stress, capable of reaching several thousands of kilonewtons (kN), exerted via one of the bearing surfaces by the supported objects, which may weight several tons. Given that the two bearing surfaces are at different temperatures, there exists in the support a thermal flow from hot areas to cold areas.

To limit the power necessary to cool the supported object, it is accordingly necessary to guarantee the thermal isolation of the support in order to decrease this thermal flow. Current cryogenic supports are often formed of a supporting cylinder called shell. Such mechanical are commonly made of stainless steel, which provides a good mechanical resistance, at a low cost. However, stainless steel is a good heat conductor, which requires using cooling systems, which are more bulky and thus not very convenient to use, and above all more expensive, to maintain the supported object at a fixed temperature.

It is possible to select materials having better thermal isolation properties than stainless steel to manufacture such shells, for example, composite materials, which are known to have a low heat conduction. However, the composite shells have a low mechanical reliability.

Another possible solution to manufacture shells of high mechanical resistance comprises using a titanium alloy (for example, TA6V). The structure thus obtained is four times more mechanically resistant than a stainless steel shell, but although it is twice more isolating than stainless steel, it has the disadvantage of being a good heat conductor, like stainless steel, while being five times more expensive to manufacture than a stainless steel shell.

SUMMARY OF THE INVENTION

The present invention provides solving the problem of the apparent incompatibility between a high mechanical stability and a high thermal and/or electric isolation power for a reliable and inexpensive support for thermal and/or electric applications.

To achieve this, the present invention provides a hollow support, comprising two substantially parallel bearing surfaces separated by a lateral surface defining a perimeter, said lateral surface comprising through openings distributed along at least one row substantially parallel to said bearing surfaces, and said support comprising at least one stiffening flange in contact with said lateral surface of said support, all along the perimeter of said lateral surface, on or in the vicinity of the or of each row of through openings.

"Parallel" row here means a series of through openings formed on the support perimeter, a portion of each opening of the series being arranged in a plane parallel to the bearing surfaces.

The support thus described enables to combine the thermal and/or electric isolation effect provided to the structure by the presence of through openings advantageously positioned in rows along the periphery of the object with the mechanical stability of a conventional support, due to the addition of stiffening flanges at the weak points of the structure. Such weak points are in particular due to the presence of the through openings in the support.

According to an embodiment, the support takes a substantially cylindrical or tapered shape and has at least one circular bearing surface forming a base.

This type of circular geometry has the advantage of being easy to form, and of not having a privileged orientation along the axis of revolution of the cylinder or of the cone. On the other hand, when the through openings are distributed to form rows having a symmetry of revolution around the axis of the cylinder, the mechanical stress applied via one of the bearing surfaces of the support is more homogeneously distributed in said support. On the other hand, this type of geometry enables to simplify the modeling of the support and thus to make the calculations of the load that the support is capable of supporting more reliable.

Especially, according to an embodiment, the through openings of each row are regularly spaced apart, the through openings of a row being offset by one half period with respect to the through openings of an adjacent row. This enables to increase the length of the path of the thermal flow through the support, and thus to contribute to increasing the thermal resistance of said support.

According to another embodiment, the support comprises through openings having the same size on each row, and a different size between at least two rows. Such a variation in the size of the through openings thus enables to increase the length of the portions which are the most sensitive, for example, to thermal swaging, without necessarily creating a high number of rows.

According to another embodiment, in each row, the maximum size of each through opening is substantially arranged in a same plane, the stiffening flange associated with said row being in contact with the lateral surface of the support in said plane. In other words, the stiffening flanges are positioned in the locations of the support comprising the lowest amount of material, that is, in the middle of each row of through openings. Such lightened areas make the structure particularly sensitive to mechanical buckling, capable of affecting the support under the effect of the loads applied via one of the bearing surfaces, and thus form adequate locations for receiving a stiffening flange. The stiffening flanges thus enable to decrease the stress at isthmuses.

According to another embodiment, the support further comprises a thermostat in contact with at least one stiffening flange to maintain it at a constant temperature. The thermostat enables to locally cool the general support down to a temperature lower than that capable of being naturally reached by this point of the support.

According to another embodiment, the support is made of a material selected from the group comprising stainless steel, titanium, copper, aluminum, epoxy, ceramic, and one of the mixtures of at least two of said materials. Such materials meet at best the different requirements of the support, and especially that of a relatively low manufacturing cost, of a good mechanical resistance, of a high Young's modulus, of an easy manufacturing, and of a good control of machining processes, which enable to manufacture reliable supports.

According to another embodiment, the stiffening flanges have a thickness smaller than twice the thickness of the support and greater than half the thickness of said support. Such a condition on the flange thickness provides an optimum mechanical stability and a good resistance to loads and to thermal swaging, according to digital simulations.

According to another embodiment, each stiffening flange has a rectangular cross-section with its largest dimension in the radial direction of said support. Such a configuration enables to achieve an optimum mechanical stability and a good resistance to loads as well as to thermal swaging. On the other hand, such a stiffening flange configuration enables to have a surface capable of supporting means for thermalizing the support to place said support in contact with a thermostat.

According to another embodiment, the support also comprises, between two rows of through openings, flange segments arranged to be substantially parallel to the bearing surfaces of the support, all along the perimeter of the lateral surface of the support. Such flanges may advantageously receive thermalization means between the rows of through openings, and may more generally be used as support means.

BRIEF DESCRIPTION OF THE DRAWINGS

The present invention will be better understood on reading of the following description provided as an example only in relation with the accompanying drawings, where the same reference numerals designate the same or similar elements, among which.

DETAILED DESCRIPTION OF THE INVENTION

A mechanical support for thermal or electric systems, referred to as "shell", having a high mechanical stability while having a good thermal or electric isolation, will now be described.

Thermal and electric conductions have similar behaviors. Although, in the rest of the text, the example of thermal isolation will be used, it should be clear that all technical considerations can be easily transposed to an electric isolation.

Figure 1:
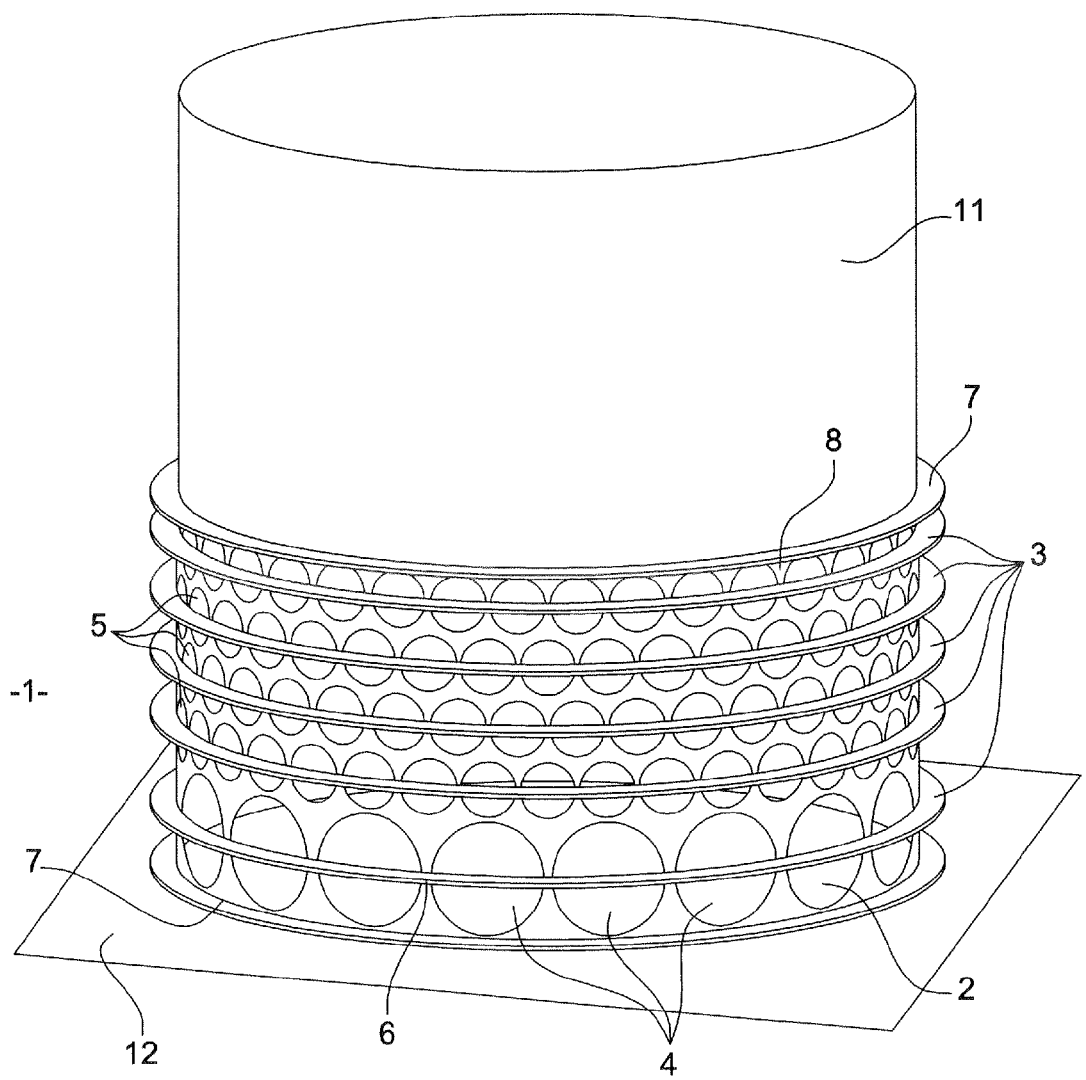
FIG. 1 is a simplified perspective view of a shell comprising through openings and stiffening flanges, according to a first embodiment of the invention.

Referring to FIG. 1, shell 1 is for example intended to support a heavy object 11 above a plane 12, where object 11 can have a mass of several tons, such as for example a hybrid superconducting magnet of high magnetic field weighting 18 tons, and capable of exerting magnetic loads likely to reach 370 tons on shell 1.

The object supported by shell 1 is maintained at very low temperature, for example, 1.8 K while the base of shell 1 may be at the ambient temperature, that is, approximately 300 K.

Shell 1 is a tubular structure comprising an upper bearing surface for supporting object 11, a lower bearing surface to be able to be laid on plane 12, and a lateral surface 8. Circular through openings 2 are made on the entire lateral surface of the support and form rows 4 of through openings on several levels 5.

Shell 1 is strengthened by stiffening flanges 3. Such stiffening flanges 3 are placed at the level of the weak points 6 of each row 4, that is, on the segments of circumferential lines comprising the less material, also called isthmuses 6.

Shell 1 is advantageously manufactured to have a regular cylindrical tubular shape. For example, according to a specific embodiment, when shell 1 is used as a support for a hybrid superconducting magnet of high magnetic field weighting 18 tons, such a shell 1 has the following characteristic dimensions:

2.3-m diameter
1.2-m height, and
12-millimeter thickness.

Shell 1 is preferentially made of a single material and in one piece, to avoid the appearing of a clearance at the junctions between materials, and also to limit mechanical deformations and stress inherent to differences in thermal expansion coefficients between materials, which may weaken the assembly. A one-piece shell 1 also has the advantage of being easier to form, but it may be envisaged to assemble several shells.

Advantageously, the selection of the material forming shell 1 results from the will to optimally meet one or several of the mentioned criteria in the following parameters:

a low thermal conductivity;
a high Young's modulus, which limits shell deformations and increases the mechanical stability;
a high resilient limit, enabling the shell to withstand high mechanical stress; a low manufacturing cost;
an easy implementation, especially to perform weldings at the level of isthmuses 6; and
a reliable shell, that is, which has no manufacturing defects and which has a long lifetime.

Shell 1 is for example made of stainless steel, of a TA6V-type titanium alloy, of copper, of aluminum, or of a composite material. Aluminum and copper have a lower Young' modulus, resilient limit, and isolation power than stainless steel and the TA6V-type titanium alloy, but they have the advantage of being easier to process in a foundry. An alloy of carbon/epoxy or glass fiber/epoxy type may be used as a composite material. As a variation, ceramics such as alumina or zirconia are low-cost ceramics, with a high isolating power and with better thermomechanical properties than stainless steel. Ceramics however have the disadvantage of being more difficult to use for complicate shapes. Stainless steels and the TA6V titanium alloy are accordingly advantageously preferred for their high Young's modulus, their reliability, their easy use, and their relatively low cost.

Through openings 2 in shell 1 result in dividing by a factor ranging from 4 to 6 the heat conduction in support 1, which has the advantage of enabling the user to save money on the cooling system of the object to be supported.

The number of through openings 2 per row 4 will advantageously be selected in order to create thin isthmuses 6, and numbers of openings having the smallest possible common sub-multiple will preferably be selected, to obtain the greatest possible symmetry in order to be homogeneous.

The arrangement of through openings 2 on shell 1 is preferably based on a logic aiming at lengthening as much as possible the path followed by the thermal flow through the material forming shell 1. Indeed, the thermal resistance of an object is proportional to the length of the path followed by heat to cross the object. The lengthening of this thermal path is optimized in the case of the staggered arrangement.

Figure 2:
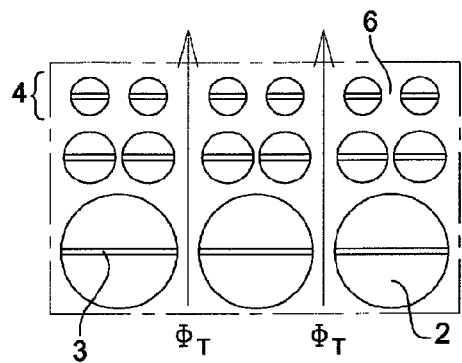
FIG. 2 is a longitudinal cross-section view of a shell portion pierced with through openings, all aligned from one level to the other.

Thus, as shown in FIG. 2, an identical arrangement of through openings from one row 4 to the other enables heat to follow a direct path along the axis of the cylinder forming shell 1. In such a configuration, heat flows from the hot portions at 300 K of shell 1 to the cold portions at 1.8 K of shell 1 by following a short path, corresponding to a minimum heat resistance.

Figure 3:
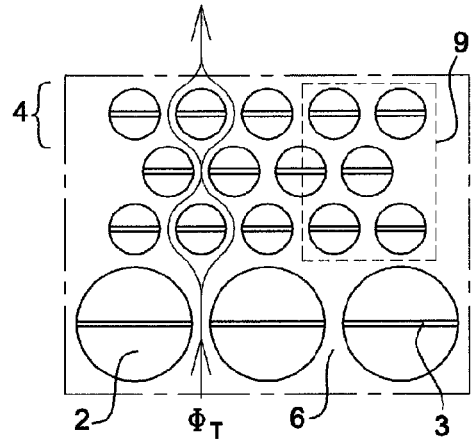
FIG. 3 is a longitudinal cross-section view of a shell portion pierced with staggered through openings.

However, by forming rows of regularly spaced apart through openings and by offsetting through openings 9 of a row 4 by one half-period with respect to the previous row, as shown in FIG. 3, the thermal path, that is, the total length of material that the thermal flow must follow to pass from the hot portion of shell 1 to the cold portions, is lengthened. This arrangement of rows 4 of through openings, also called staggered arrangement 9, results in increasing the thermal resistance of shell 1.

Figure 6:
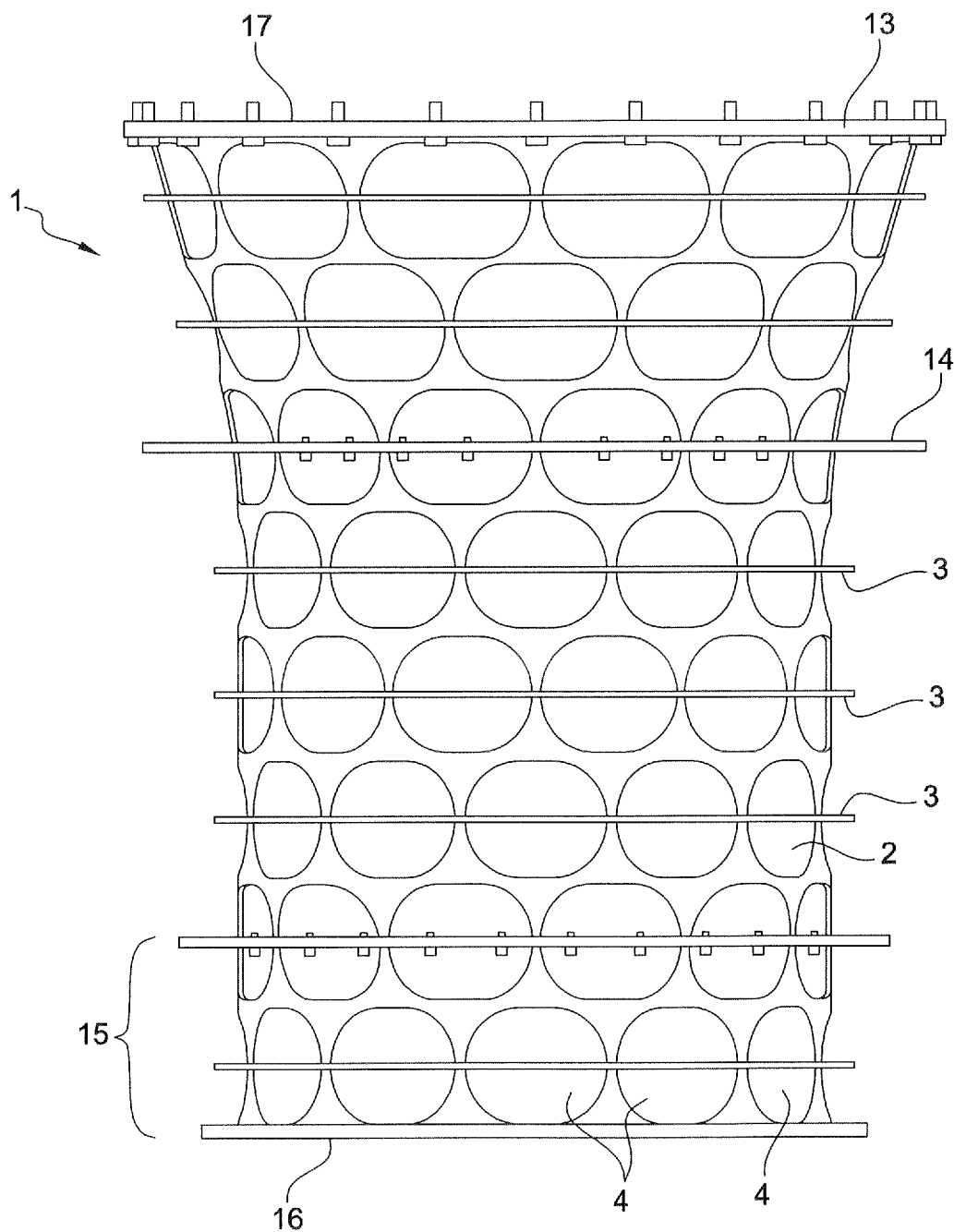
FIG. 6 is a simplified perspective view of a substantially tapered shell.

The size of through openings 2 as well as their number and their shape, enables to vary the mechanical resistance of shell 1 as well as the thermal isolation efficiency. In particular, oblong holes may be used to increase the length of the thermal path, as shown in FIG. 6.

Indeed, for a given hole width, when there is a large number of through openings 2 in shell 1, the heat transmission occurs through a larger number of thermal paths, of much smaller cross-section. Thus, the larger the total surface area taken up by through openings 2 on the surface of shell 1, the lower the thermal conduction and the higher the isolation power of shell 1.

The size of through openings 2 may vary from one row 4 to the other. For example, it is advantageous to have larger through openings 2 for rows 4 submitted to the highest thermal swaging, since expansion coefficients vary along with temperature. For stainless steel, the highest thermal swaging occurs between 300 K and 100 K. By increasing the length of the area corresponding to temperatures ranging between 300 K and 100 K, deformations are distributed along a greater length, thus decreasing the associated thermomechanical stress.

At a microscopic scale, the specific shape of through openings 2, especially at the level of isthmuses 6, could modify the propagation of phonons (vibrations of the atoms forming the material of shell 1) and thus influence the heat propagation in shell 1.

However, the lacunar structure of shell 1, pierced with through openings 2, has the disadvantage of weakening the structure of shell 1 outside specific mechanical stiffening measures, and thus of decreasing the maximum load that it is capable of supporting with no risk of buckling.

Stiffening flanges 3 are thus rigidly attached to shell 1, for example, by welding, preferably at the level of isthmuses 6 of shell 1. Indeed, these areas, which correspond to the segments of circumferential lines of shell 1, having the smaller amount of material, are weak points responsible for the first buckling modes, when shell 1 is submitted to significant mechanical stress by the object that it supports. It is accordingly advantageous to rigidly attach ring-shaped stiffening flanges 3, along such circumferential lines segments, to shell 1. The flanges may also be placed inside of the shell or simultaneously inside and outside. The flanges also enable to decrease the mechanical stress at the isthmuses without really increasing the heat conductivity.

Such a preferred positioning of stiffening flanges 3 at the level of isthmuses 6 further meets a thermal constraint. Indeed, on cooling down of shell 1, the shell and stiffening flanges 3 are submitted to thermal swaging, which results in mechanical deformations called "bead effect". It is accordingly advantageous to form stiffening flanges 3 resisting thermal swaging without being damaged by a cooling cycle. Thus, stiffening flanges 3 and their position on the isthmuses meet a double requirement: an increased mechanical stability to ensure the blocking of buckling modes of shell 1 due to mechanical loads supported by shell 1, and an increased flexibility with respect to deformations induced by temperature variations in shell 1. The stiffness is greater on the circumferential lines having the largest amount of material, for example, between two rows of through openings 4. It is thus disadvantageous to place flanges between two rows of such openings 4.

Figure 4:
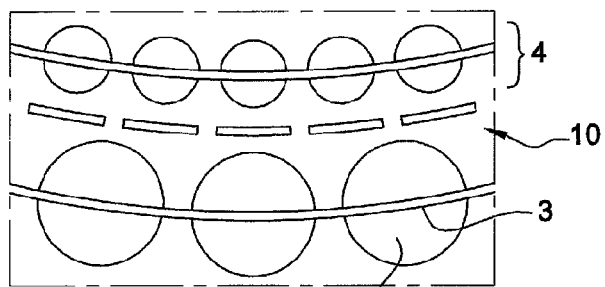
FIG. 4 is a simplified perspective view of a shell portion pierced with through openings and comprising inter-stage flanges divided into sectors.

It can however be envisaged to place intermediate flanges 10 between two rows of through openings 4, along circumferential lines comprising no openings 2, as shown in FIG. 4. Since these areas between two rows 4 are strongly submitted to deformations induced by temperature variations (or bead effect) of shell 1 during its use, it is advantageous to use intermediate flanges 10 in the form of several independent segments, which amounts to dividing flanges 10 into sectors to make them more flexible. Thereby, the deformations undergone by each segment of a flange 10, under the effect of thermal swaging, remain low and the mechanical stability of the structure is not affected.

Figure 5:
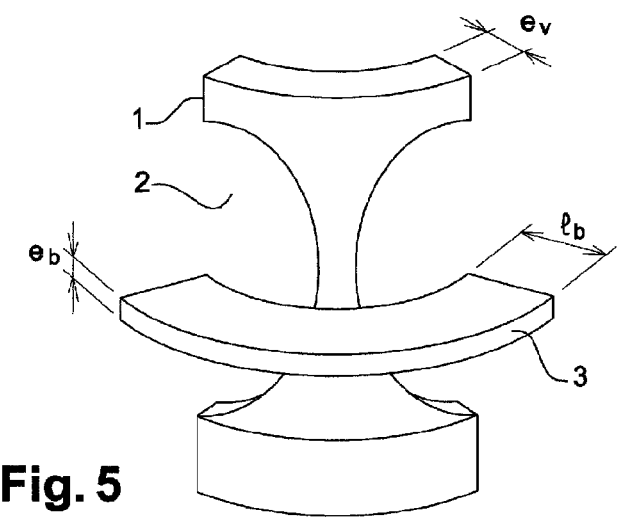
FIG. 5 is a perspective detail view of a shell.

Referring to FIG. 5 which is a perspective detail view of a shell 1, thickness $e_b$, of stiffening flanges 3 is advantageously selected to be substantially identical to thickness $e_v$ of shell 1. Indeed, the preferred method for connecting stiffening flanges 3 to shell 1 is welding. The welding is eased in the case where the two elements to be connected have substantially identical thicknesses, especially when the thickness of each stiffening flange is smaller than twice the thickness of shell 1, and greater than half the thickness of shell 1. For example, in the case of the previously-mentioned superconducting magnet, for a thickness $e_v$ of shell 1 of 12 mm, this optimum appears for a thickness $e_b$ of stiffening flange 3 of 15 mm.

Width $l_b$ of stiffening flanges 3 is advantageously selected to correspond to an optimum mechanical resistance of shell 1. For example, for a shell 1 having a thickness $e_v$ of 12 mm, this optimum is achieved for a width $l_b$ of stiffening flange 3 of 50 mm of rectangular cross-section. It is generally advantageous to select stiffening flanges 3 having a substantially rectangular cross-section and having a width greater than its thickness.

Stiffening flanges 3 may, in addition to their stiffening function, perform a second thermalization function. Indeed, by taking stiffening flanges 3 to temperatures lower than that of shell 1 at the level of isthmuses 6, the thermal path between such intermediate temperatures and the lowest temperature is increased. The coldest area, which is the most expensive to cool down, is thus isolated. The generally isolation is the same but it has a different distribution. For example, a shell 1 having one of its bearing surfaces supporting an object at a 1.8-K temperature and having its other end at the ambient temperature of approximately 300 K will advantageously have several stiffening flanges 3 taken to cryogenic temperatures by one or several thermostats (not shown). Thus, support 1 comprising five rows 4 of through openings, each comprising a stiffening flange 3, will have three stiffening flanges 3 respectively taken to 118 K, 43 K and 4.8 K.

According to other embodiments, shell 1 may have a plurality of different shapes, for example, tapered, oval-shaped, polyhedral, regular or not. Similarly, the through openings may have several shapes. It is also possible for shell 1 to have dimensions different from those mentioned hereabove. A thicker shell 1 has the advantage of providing a better mechanical stability but has the disadvantage of providing, at the same time, a better heat conduction. A thick shell 1 may also have the disadvantage of enhancing skin stress on the output surface of support 1, in the case of strong flexions (for example, due to thermal swaging), thus weakening the entire shell 1 and increasing the risk of buckling.

The number of through openings 2 per row 4 may vary from one shell 1 to the other. A shell 1 having a different number of through openings 2 from one row to the other may also be envisaged, although a configuration where the number of through openings 2 of two neighboring rows 4 have the smallest possible common sub-multiple will be preferred.

The location and the number of stiffening flanges 3 may also be different from that described hereabove. Indeed, a shell 1 having several series of stiffening flanges 3 on each row 4 would enable to further increase the mechanical stability of shell 1. However, the additional mechanical stability acquired by the addition of additional stiffening flanges 3 on a row is lower than that obtained by the increase of the number of rows 4. It is thus preferable to increase the number of levels 5 of rows 4 of through openings and to have a single stiffening flange 3 at the level of isthmuses 6 of each row 4, rather than to increase the number of stiffening flanges 3 per row 4 and thus the number of weldings. It is further possible to increase the number of levels 5 of rows 4 of through openings by piercing more openings 2 of smaller size.

The thermalization, that is, the maintaining at a given temperature, of flanges 3 is not indispensable, and the selection of levels 5 where such a thermalization is applied is a function of the specific configuration of shell 1 and of its use. It will be within the abilities of those skilled in the art to adapt these parameters according to what use is made of shell 1.

As an example of other embodiments of the present invention, FIG. 6 shows a shell 1 of substantially tapered shape with through openings 2 of substantially oblong shape, all having a 72-mm length and a 104-mm diameter. Shell 1 has a 900-mm height, a 2-mm thickness, and a diameter varying from 653 mm for thermalized bearing surface 13 at the ambient temperature to 520 mm for thermalized bearing surface 16 at 4.2 K. Stiffening flanges 3 have a 2-mm thickness and a 16-mm width, in accordance with the above discussion. Shell 1 can support a 50-kg load, axially, laterally, or in all intermediate directions. The material selected to form the assembly is stainless steel, and the shell only has three thermalized flanges, respectively 17 at 300 K, 14 at 35 K, and an area 15 at 4.2 K.

FIG. 1 shows upper and lower flanges 7. Flanges 7 are intended to be used as an interface between the support and the load to be supported, on the one hand, and between the support and the ground or plane 12.

Such flanges are not compulsory. However, the stiffer they are (or the more rigid their connection with the plane), the greater their capacity of blocking a buckling mode.

Although the present disclosure only mentions shells 1 adapted to a use in cryogenics, shell 1 may be envisaged for other similar applications, for example, applications where the temperature is higher, without departing from the general idea of the invention. Similarly, a use as an electrically-isolating support, for example, at ambient temperature, also is an application of the invention.

The invention claimed is:

1. A hollowed support comprising two bearing surfaces, substantially parallel to each other, and separated from each other by a lateral surface defining a perimeter, wherein
    said lateral surface comprises through openings distributed along at least one row substantially parallel to said bearing surfaces, and
    said support comprises at least one stiffening flange in contact with said lateral surface of said support, all along said perimeter of said lateral surface, in one of on or in the vicinity of a centerline of the through openings having the smallest amount of material between the respective openings so as to intersect a portion of the at least one row of through openings.

2. The support of claim 1, wherein the support has a substantially cylindrical shape.

3. The support of claim 1, wherein the support has a substantially tapered shape.

4. The support of claim 1, wherein the support has a circular bearing surface forming a base.

5. The support of claim 1, wherein the through openings of each row are regularly spaced apart, the through openings of a row being offset by one half-period with respect to those of an adjacent row.

6. The support of claim 1, wherein the through openings have a same size on each row and have a different size between at least two rows.

7. The support of claim 1, wherein for each row, the maximum dimension of each through opening is substantially arranged in a same plane, the stiffening flange associated with said row being in contact with the lateral surface of the support in said plane.

8. The support of claim 1, wherein it further comprises a thermostat in contact with at least one stiffening flange to maintain said flange at a constant temperature.

9. The support of claim 1, wherein the support is made of a material selected from the group comprising stainless steel, titanium, copper, aluminum, epoxy, ceramics, as well as one of the mixtures of at least two of said materials.

10. The support of claim 1, wherein the stiffening flanges have a thickness lower than twice the thickness of the support and greater than half the thickness of said support.

11. The support of claim 1, wherein each stiffening flange has a rectangular cross-section having its largest dimension in the radial direction of said support.

12. The support of claim 1, wherein the support also comprises, between two rows of through openings, segments of flanges arranged to be substantially parallel to the bearing surfaces of said support, all along the perimeter of the lateral surface of said support.

13. The support of claim 1, wherein said support is a thermally-isolating device.

14. The support of claim 1, wherein said support is an electrically-isolating device.

* * * * *